United States Patent
Brown (10) Patent No.: US 11,325,024 B1
(45) Date of Patent: May 10, 2022

(54) DECK OF CARDS AND METHOD OF USE THEREOF

(71) Applicant: Janice Marie Brown, Los Angeles, CA (US)

(72) Inventor: Janice Marie Brown, Los Angeles, CA (US)

(*) Notice: Subject to any disclaimer, the term of this patent is extended or adjusted under 35 U.S.C. 154(b) by 93 days.

(21) Appl. No.: 16/871,571

(22) Filed: May 11, 2020

Related U.S. Application Data (60) Provisional application No. 62/819,241, filed on Mar. 15, 2019.

(51) Int. Cl.
| | |
|---|---|
| *A63F 3/04* | (2006.01) |
| *A63F 1/00* | (2006.01) |
| *A63F 1/04* | (2006.01) |
| *G07F 17/32* | (2006.01) |
| *G06F 7/58* | (2006.01) |
| *G09B 17/00* | (2006.01) |

(52) U.S. Cl.
CPC ............ *A63F 3/0423* (2013.01); *A63F 1/00* (2013.01); *G06F 7/588* (2013.01); *G07F 17/3213* (2013.01); *G07F 17/3265* (2013.01); *G07F 17/3293* (2013.01); *G07F 17/3295* (2013.01); *A63F 1/04* (2013.01); *G09B 17/00* (2013.01)

(58) Field of Classification Search
CPC ...... A63F 1/00; A63F 1/02; A63F 1/04; A63F 1/06; A63F 1/10; A63F 1/18; A63F 2001/0408; A63F 2001/0416; A63F 2001/0441; A63F 2001/0458; A63F 2001/0466; A63F 2001/0475; A63F 2001/0491; G07F 17/3293; G07F 17/3295
See application file for complete search history.

(56) References Cited

U.S. PATENT DOCUMENTS

| | | | | | |
|---|---|---|---|---|---|
| 3,618,231 | A | * | 11/1971 | Nason | G09B 17/00 |
| | | | | | 273/295 |
| 4,826,175 | A | * | 5/1989 | Quatrino | A63F 1/04 |
| | | | | | 273/299 |
| 4,877,254 | A | * | 10/1989 | Yuscavage | A63F 3/04 |
| | | | | | 273/249 |
| 4,923,199 | A | * | 5/1990 | Hahn | A63F 3/0423 |
| | | | | | 273/272 |
| 5,403,014 | A | * | 4/1995 | Anema | A63F 3/0478 |
| | | | | | 273/148 A |

(Continued)

*Primary Examiner* — Milap Shah
(74) *Attorney, Agent, or Firm* — Plager Schack LLP; Mark H. Plager; Kara Verryt (57) ABSTRACT

A game that promotes abstract reasoning, problem solving, spatial reasoning, and time management may include use of particular game components, wherein the game components include a deck of cards; a random number generator; a random theme generator; a timer; and a card holder. The deck of cards may include a plurality of alphabet cards; a plurality of numerical cards; a plurality of bonus point cards; at least one universal symbol card; and at least one wild card. A separate deck may include at least one symbol card. The random theme generator may be a six sided dice, wherein each side of the dice has a theme marked thereon, the themes being: alpha, alpha number, alpha symbol, alpha number symbol, player choice, and dealer's choice. Playing the game may include manipulating a set of dealt cards to create words and phrases that correspond with a generated theme.

6 Claims, 8 Drawing Sheets

(56) References Cited

U.S. PATENT DOCUMENTS

| | | | | |
|---|---|---|---|---|
| 5,788,238 | A * | 8/1998 | LeBriton | A63F 3/0423 |
| | | | | 273/272 |
| 5,863,043 | A * | 1/1999 | Bitner | A63F 1/00 |
| | | | | 273/299 |
| 6,234,486 | B1 * | 5/2001 | Wallice | A63F 1/00 |
| | | | | 273/272 |
| 6,575,468 | B1 * | 6/2003 | Hall | A63F 1/00 |
| | | | | 273/138.1 |
| 6,623,009 | B1 * | 9/2003 | Kraemer | A63F 3/0423 |
| | | | | 273/272 |
| 8,672,328 | B2 * | 3/2014 | Bazarko | A63F 9/20 |
| | | | | 273/294 |
| 2001/0035612 | A1 * | 11/2001 | Loder | A63F 1/00 |
| | | | | 273/292 |
| 2003/0085522 | A1 * | 5/2003 | Loder | A63F 1/00 |
| | | | | 273/292 |
| 2010/0207329 | A1 * | 8/2010 | Bigelow | A63F 9/0098 |
| | | | | 273/299 |

\* cited by examiner

STIMULATING CARD GAME

| THEMES | WORDS/QUOTES POINTS PLAYER 1 | WORDS/QUOTES POINTS PLAYER 2 | WORDS/QUOTES POINTS PLAYER 3 | WORDS/QUOTES POINTS PLAYER 4 | WORDS/QUOTES POINTS PLAYER 5 | WORDS/QUOTES POINTS PLAYER 6 |
|---|---|---|---|---|---|---|
| ALPHA<br>ALPHA/NUMBER<br>ALPHA/SYMBOL<br>ALP/NUM/SYM<br>DEALER SELECTS<br>PLAYERS CHOICE | | | | | | |
| ALPHA<br>ALPHA/NUMBER<br>ALPHA/SYMBOL<br>ALP/NUM/SYM<br>DEALER SELECTS<br>PLAYERS CHOICE | | | | | | |
| ALPHA<br>ALPHA/NUMBER<br>ALPHA/SYMBOL<br>ALP/NUM/SYM<br>DEALER SELECTS<br>PLAYERS CHOICE | | | | | | |
| ALPHA<br>ALPHA/NUMBER<br>ALPHA/SYMBOL<br>ALP/NUM/SYM<br>DEALER SELECTS<br>PLAYERS CHOICE | | | | | | |
| ALPHA<br>ALPHA/NUMBER<br>ALPHA/SYMBOL<br>ALP/NUM/SYM<br>DEALER SELECTS<br>PLAYERS CHOICE | | | | | | |
| ALPHA<br>ALPHA/NUMBER<br>ALPHA/SYMBOL<br>ALP/NUM/SYM<br>DEALER SELECTS<br>PLAYERS CHOICE | | | | | | |
| ALPHA<br>ALPHA/NUMBER<br>ALP/NUM/SYM<br>DEALER SELECTS<br>PLAYERS CHOICE | | | | | | |

DECK OF CARDS AND METHOD OF USE THEREOF

BACKGROUND

The embodiments herein relate generally to games, and more particularly, to a deck of cards for use in playing a stimulating card game.

Most types of card games use standardized cards and methods that limit the scope of enjoyment and intellectual stimulation. At the same time, more and more individuals are looking for stimulating and challenging new games both for entertainment purposes and for promoting brain health. Additionally, many games can only be played as a single player or only as a multiplayer game, which is inconvenient if the correct number of players are not present.

Therefore, what is needed is a new game using a unique deck of cards that promotes abstract reasoning, problem solving, spatial reasoning, time management, and the like. Moreover, what is needed is a game that inspires players to think out of the box in unconventional ways, while simultaneously being fun and challenging but not too complicated such that players lose interest.

SUMMARY

Some embodiments of the present disclosure include a game that promotes abstract reasoning, problem solving, spatial reasoning, and time management. The game may include use of particular game components, wherein the game components include a deck of cards; a random number generator; a random theme generator; a timer; at least one card holder; and a score pad. The deck of cards may include alphabet cards; numerical cards; bonus point cards; at least one universal symbol card; and at least one wild card. The components may also include symbol cards used separately from the deck of cards. The random theme generator may be a six sided dice, wherein each side of the dice has a theme (alpha, alpha number, alpha symbol, alpha number symbol, player choice, and dealer's choice) marked thereon. Playing the game may include manipulating a set of dealt cards to create words and phrases that correspond with a generated theme.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a stimulating game and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

a. Deck of Cards
b. Random number generator
c. Random theme generator
d. Timer
e. Card Holder
f. Score Pad The various elements of the device of the present disclosure may be related in the following exemplary fashion. It is not intended to limit the scope or nature of the relationships between the various elements and the following examples are presented as illustrative examples only.

By way of example, and referring to FIGS. 1-11, some embodiments of the present disclosure include a new game using a unique deck of cards that challenges a player's ability to organize their thoughts using pattern recognition with letters, symbols, and numbers and to find similarities in word structure. For example, in embodiments, the game 10 may comprise a deck of cards, a random number generator 26, a random theme generator 28, a timer 24, and a card holder 30, wherein a user or users interact with the deck of cards, the random number generator 26, the random theme generator 28, the timer 24, and the card holder 30 to promote abstract reasoning, problem solving, spatial reasoning, and time management. In some embodiments, the random number generator is an electronic machine programmed with instructions to select an integer between one and six. In other embodiments, a cubic die can be used as illustrated. In some embodiments, the random theme generator is an electronic machine programmed with instructions to select theme from a set of given themes. In other embodiments, a cubic theme die can be used as illustrated.

Figure 11:
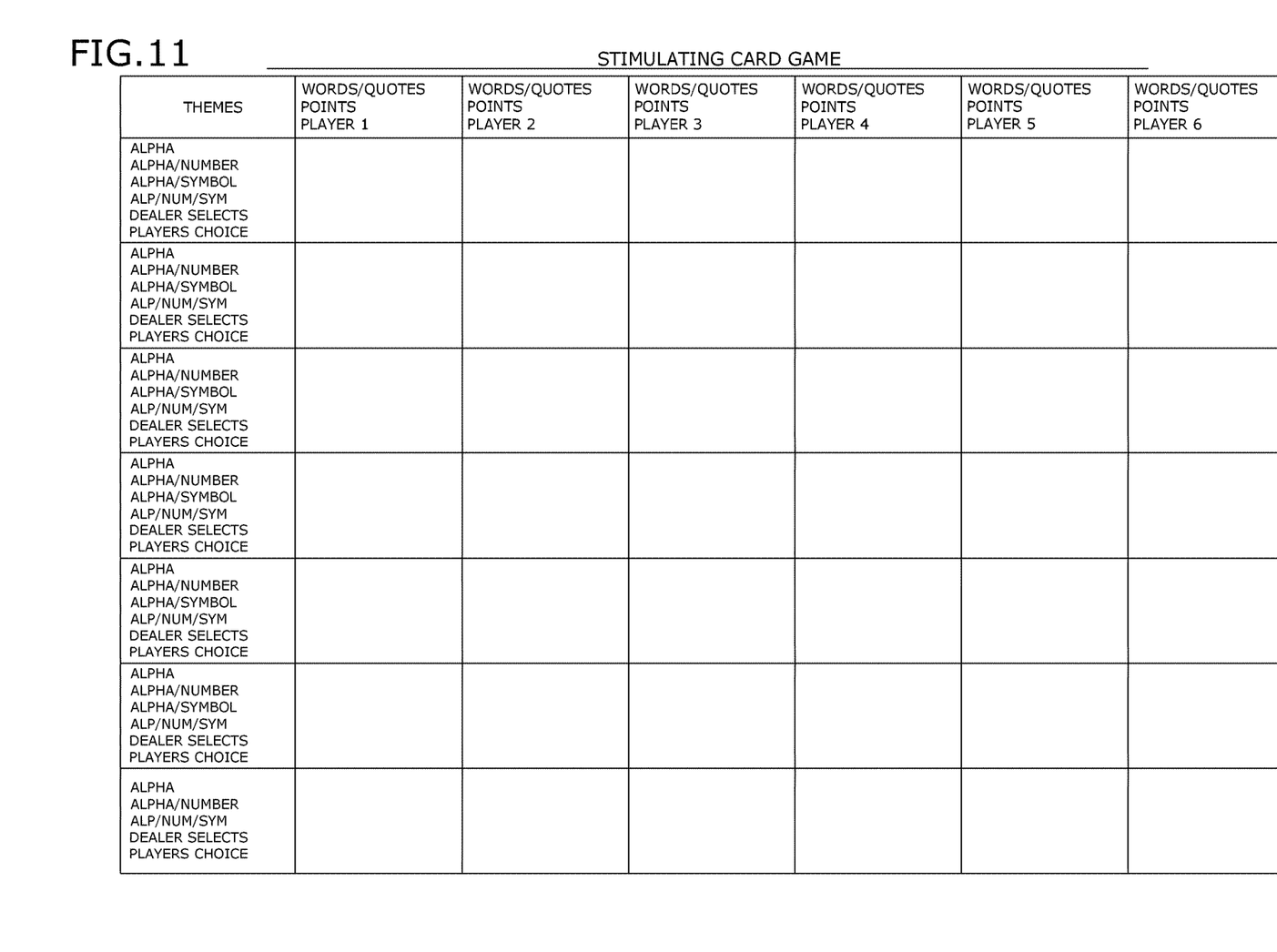
FIG. 11 is a perspective view of one embodiment of the present disclosure.

Embodiments may also include a score pad, as shown in FIG. 11. In some embodiments, the score pad can be integrated into an electronic system where the electronic system uses a spreadsheet, database, or equivalent to receive numerical inputs from at least one user. These numerical inputs can be one time use or players can have a specific login in order to track progress over time.

Figure 1:
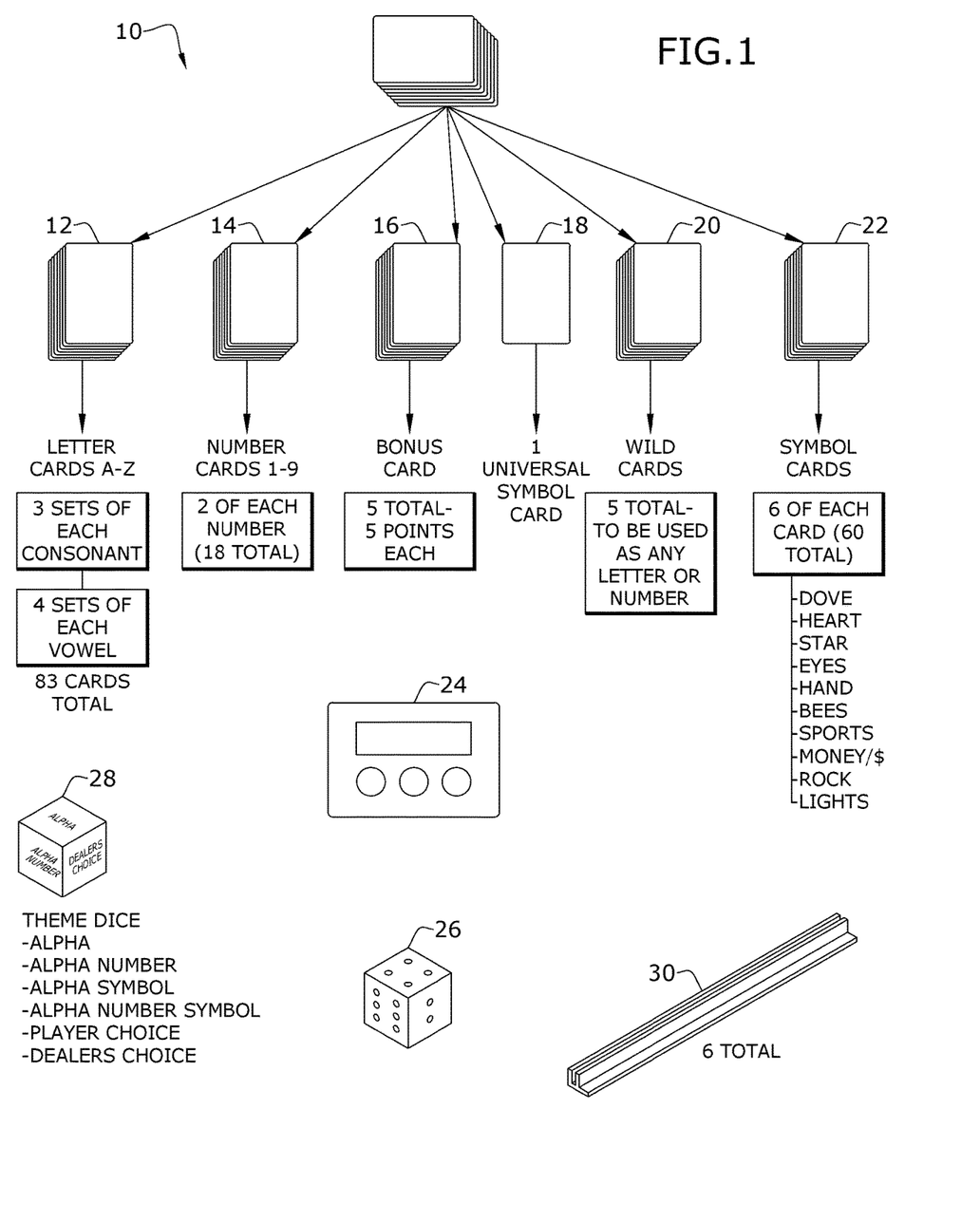
FIG. 1 is a schematic view of one embodiment of the present disclosure.

As shown in FIG. 1, the deck of cards may comprise a plurality of alphabet cards 12, a plurality of numerical cards 14, a plurality of bonus point cards 16, at least one universal symbol card 18, at least one wild card 20, and at least one symbol card 22 that is used separate from the deck of cards.

Specifically, the alphabet cards 12 may comprise letter cards including the letters A through Z printed or otherwise marked thereon. For example, the deck may comprise 83 letter cards including three sets of each consonant letter in the English alphabet and four sets of each vowel letter (A, E, I, O, U) in the English alphabet. In certain embodiments of game play, the letter cards may be used to enhance words and phrases and may be used in multiples. For example, "LIFSGUD" may make the phrase "LIFE IS GOOD." Moreover, in some versions of the game, a letter (such as O) may not be used as a number (such as zero).

The numerical cards 14 may comprise number cards including the numbers 0-9 printed or otherwise marked thereon. For example, the deck may comprise 20 number cards including two sets of each number 0 through 9. Number cards may be used to enhance words and phrases and may be used in multiples. For example, "10ESSE" may make the word "TENNESSEE." In embodiments of game play, number cards may not be substituted for letters (i.e., the number 3 may not be substituted for the letter E).

The symbol cards 22 may comprise a variety of symbols printed or otherwise marked thereon. For example, the symbol cards 22 may comprise 10 different symbols (dove/bird, heart/love, star, eyes/see/"I", hand, bees/"B", sports, money/dollar, rock/stone, and light/bright) printed thereon, wherein there may be 6 of each symbol card for a total of 60 symbol cards, used separately from the deck of cards. In some embodiments of game play, only one symbol card may be used for each word and phrase, wherein a symbol card may be used to enhance word structure when using both the random theme generator and alternate themes. See, for example, FIGS. 8 and 9, described more below. During game play, each player may receive a set of symbol cards that may be kept throughout the entire game and not discarded.

The deck may comprise a plurality of bonus point cards 16, such as 5 bonus point cards 16. The bonus point cards 16 may each include a special symbol printed or otherwise marked thereon, such that they are easily identifiable as bonus card 16. For example, each bonus point card 16 may include a substantially centrally located lotus flower with the number 5 printed in the middle thereof and the term "Bonus Points" positioned vertically below the lotus flower. During play, bonus point cards are not used to enhance words; rather, their purpose is to add points to the player's score. Whether or not a player was able to make a word or phrase, when player receive a bonus point card, it may be put aside, and the points may be added after the round, after which it is discarded.

Figure 10:
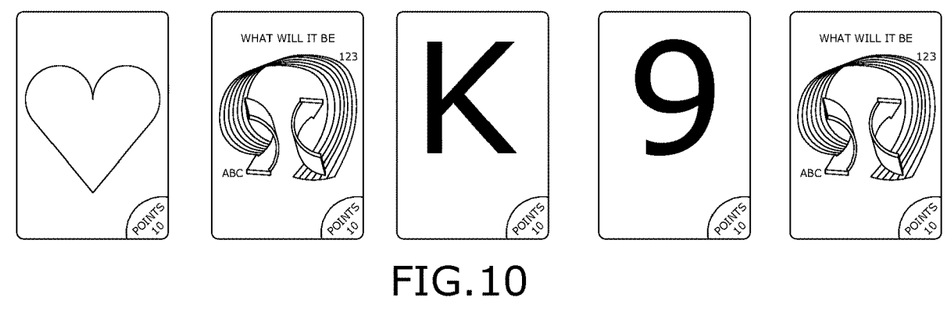
FIG. 10 is a perspective view of one embodiment of the present disclosure.

The deck may comprise a plurality of wild cards 20, such as 5 wild cards 20, wherein the wild cards are able to be used as any letter or number card, as desired. As shown in FIG. 10, the wild card 20 may comprise a card with a rainbow with arrows printed thereon, wherein the phrase "What Will It Be" is printed vertically above the rainbow with letters and numbers indicating a dual use of the card. The wild cards 20 may be used to enhance words and phrases and may be used in multiples during game play.

Lastly, the deck may comprise at least one universal symbol card 18, wherein the universal symbol card 18 may comprise a special symbol printed or otherwise marked thereon, such that it is easily identifiable as a universal symbol card 18. Some versions may include two universal symbol cards 18. For example, the universal symbol card 18 may comprise a graphic showing two faces with symbols and words over it along with "Universal Symbol Card" printed vertically below the graphic. During play, the universal symbol card 18 may allow a player to either use the same symbol twice or choose a different symbol other than what is in the player's set. Additionally, in some embodiments of game play, the universal symbol card 18 may be used multiple times.

Taking the different types of cards together, as shown in FIG. 1, embodiments of the deck may comprise 115 total cards-83 alphabet cards 12, 20 number cards 14, 5 bonus point cards 16, 2 universal symbol cards 18, and 5 wild cards 20. A separate deck may comprise 60 symbol cards 22.

As mentioned above, the game 10 may also comprise a random number generator 26, wherein the sides of the dice include numbers 1-6, and a random theme generator 28. The random theme generator 28 may be a 6-sided dice, as shown in FIG. 1, and may include the following themes printed or otherwise marked thereon: ALPHA (letter cards), ALPHA/NUMBER (letter number card combinations), ALPHA/SYMBOL (letter symbol card combination), ALPHA/NUMBER/SYMBOL (letter number symbol card combinations), PLAYER CHOICE (players choose individual themes from random theme generator, excluding dealer choice), and DEALER'S CHOICE (dealer may use game random theme generator and random number generator for alternate themes). During play, the random theme generator 28 may be used to determine the theme for any given round. Alternatively, if players agree prior to starting each round, the dealer may use alternate themes and assign a number (1-6) to them, wherein the theme is ultimately chosen by rolling the random number generator to assign the corresponding theme to the round. Examples of themes that a dealer may decide to choose with possible combinations are sports-3PEAT, TTYME; animals-HAMSTR, 2CAN, acronyms-RSVP, ICU; wacky words-PIKUBU, WIFEY; bible-PSALM23, PR8ZHM; proper names-K8TY, JAKNJYL. When displaying various card configurations, letter, number, symbol combinations may not be grammatically correct or spelled correctly as with the rules of language.

The game 10 may also include card holders 30, such as 6 card holders, wherein the card holders 30 comprise an elongate rack sized to hold a plurality of cards. Keeping players hands free, allows them to view cards while arranging words and phrases in this fast paced game.

In embodiments, the game 10 may further comprise a score pad such that players can keep track of the themes played, winning words, and points earned at the end of each round. An exemplary score pad is shown in FIG. 11. As shown in FIG. 11, the score pad may comprise a plurality of rows and columns, wherein the first column includes a plurality of boxes having identical contents and the remaining columns are the scoring area designated for each player. While an exemplary score pad is shown in FIG. 11, and players may keep score in any suitable fashion using any desired material.

Figure 6:
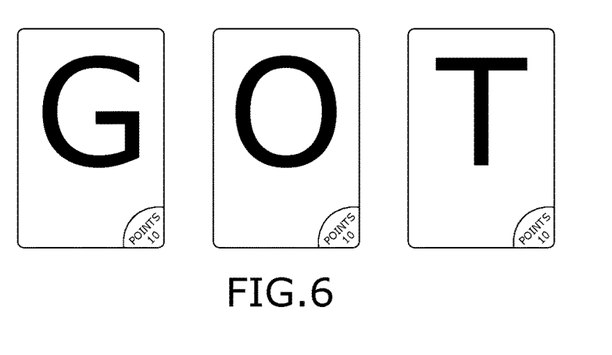
FIG. 6 is a perspective view of one embodiment of the present disclosure.
Figure 7:
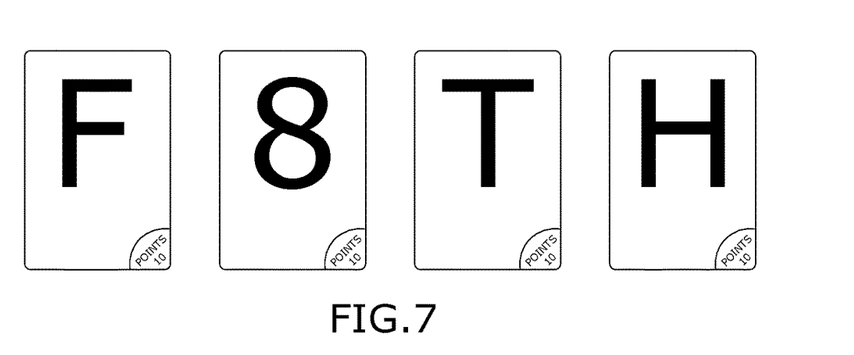
FIG. 7 is a perspective view of one embodiment of the present disclosure.
Figure 8:
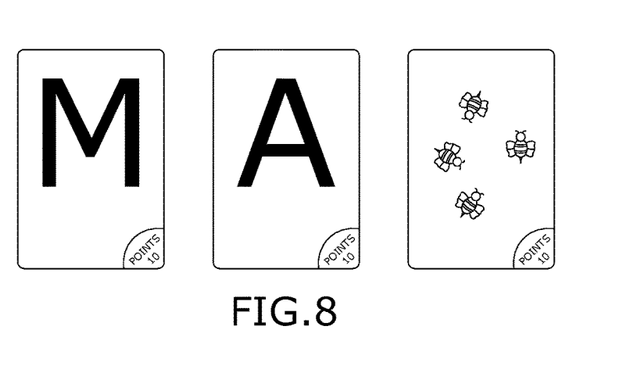
FIG. 8 is a perspective view of one embodiment of the present disclosure.
Figure 9:
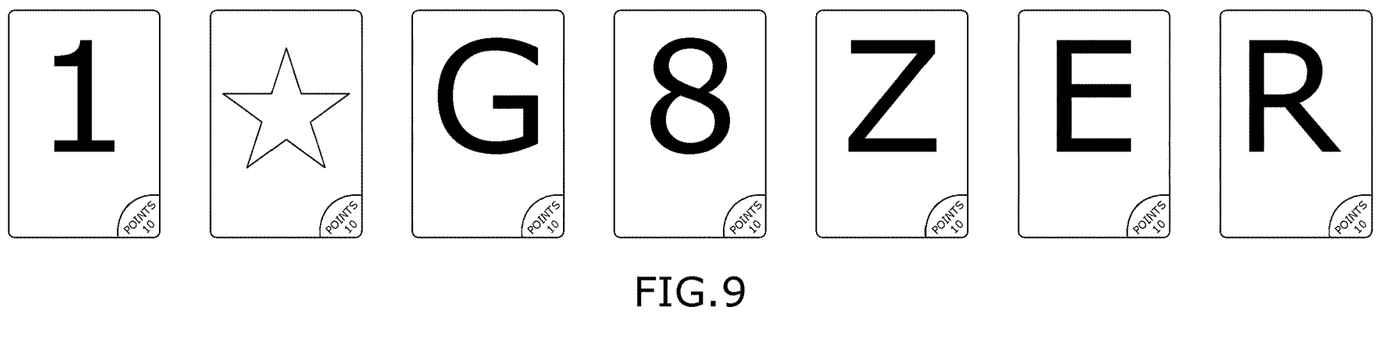
FIG. 9 is a perspective view of one embodiment of the present disclosure.

At a top level, a method of playing the game may comprise providing the game components, as listed above, generating a theme such as by rolling the random theme generator and identifying the theme by viewing a side of the random theme generator that is parallel to a playing surface or by players choice, meaning that each individual player decides on any theme of their choice, not limited to those shown on the random theme generator; dealing a plurality of cards to a player; manipulating the cards to create words and phrases that correspond with the generated theme; and calculating a score based on the created words or phrases. Exemplary game card usages are shown in FIGS. 6-10. For example, FIG. 6 uses three alphabet cards to form the word GOT. FIG. 7 uses three alphabet cards and one number card to form the word FAITH. If the cards in FIGS. 6 and 7 are combined, the phrase "GOT FAITH" would be formed. FIG. 8 uses two alphabet cards and one symbol card to form the word "MAYBE". FIG. 9 uses a combination of alphabet cards, number cards, and a symbol card to form the phrase "ONE STARGAZER". FIG. 10 uses a combination of alphabet, number, symbol, and wild cards to form the phrase "LOVE FOR CANINES". Each of the card usages shown in FIGS. 6-10 would accumulate points based on the point value shown on each card. The Figures shows "10 points" in the bottom corner of each card for illustrative purposes only, but the point values for each card may vary.

Point values for the different types of cards may be as follows: alphabet cards—6 points each, number cards—4 points each, wild card—10 points each, bonus card—5 points each, symbol card—10 points each, and universal symbol card—5 points each.

The components of the game 10 may be used to play various versions of the game. For example, the game may be played as a single player game or as a multiplayer/team game. The game may also be played in an accelerated mode and other alternative versions, as described in more detail below. Also, prior to the start of any game, players may agree to use other game themes, as described above.

Figure 2:
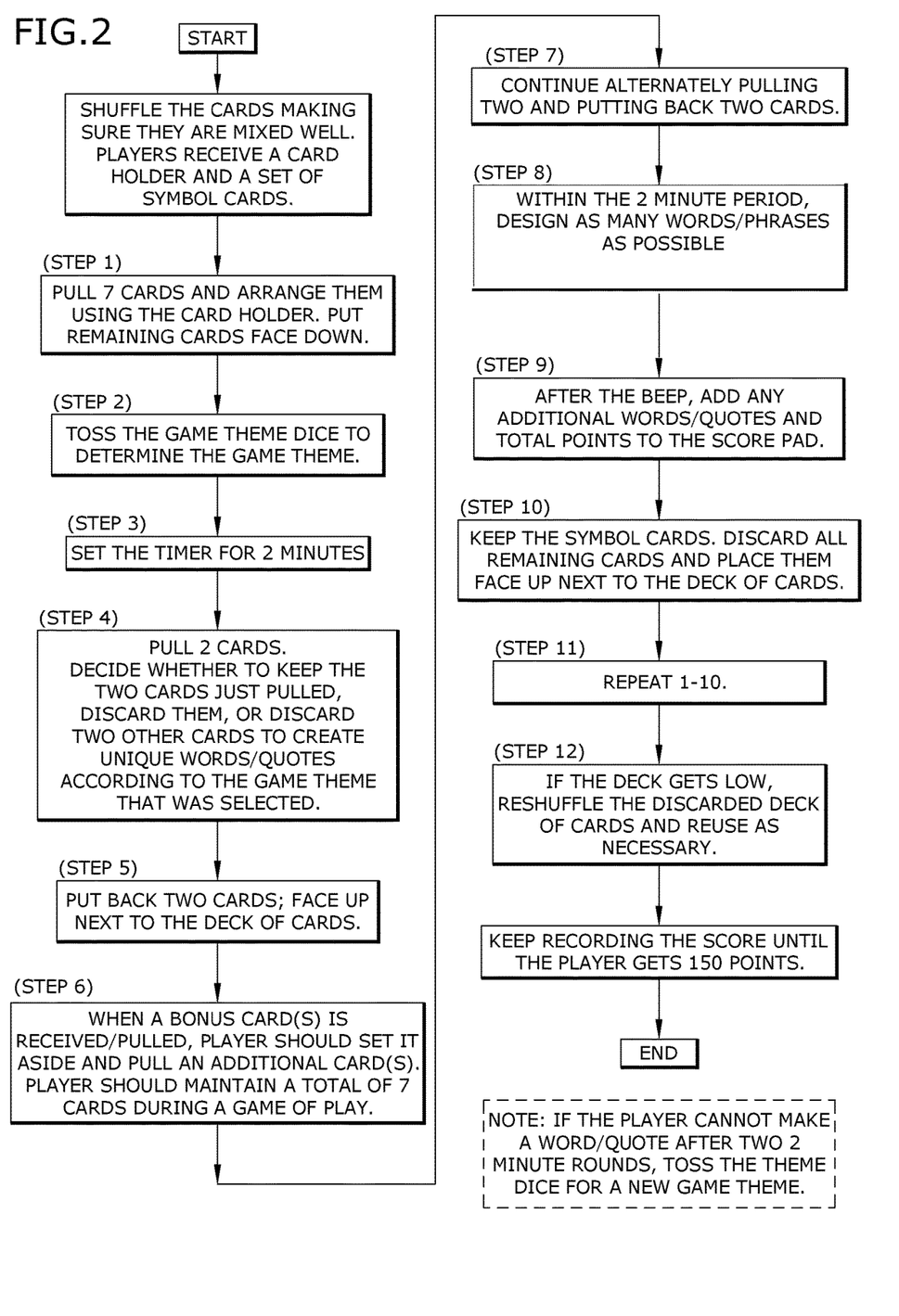
FIG. 2 is a flow chart describing one embodiment of the present disclosure.

Single Player Game:

As shown in FIG. 2, a single player version of the method of playing the game of the present disclosure may comprise providing a player with a playing surface including a card holder and a score pad; providing the player with a set of 10 symbol cards; shuffling a deck of cards comprising 83 alphabet cards, 20 number cards, 5 bonus point cards, 2 universal symbol cards, and 5 wild cards; pulling 7 cards from the shuffled deck, putting aside any bonus point cards and pulling additional cards as necessary to reach 7 total cards, and placing the remaining cards face down on the playing surface; generating a game theme by tossing a random theme generator and identifying the theme shown on a top surface of the random theme generator, wherein the user tosses the dice again if Dealer Choice is received or chooses an alternate theme using the random number generator, as described above; setting a timer for a predetermined period of time, such as for 2 minutes; and turning the dealt cards over and determining whether the dealt cards can be used. Bonus point card(s) may set aside and pull additional card(s) to have a total of 7 cards for the game. If the dealt cards can be used, the method comprises forming words and phrases according to the theme. Otherwise, the method comprises removing two additional cards from the shuffled deck and choosing a member selected from the group consisting of keeping the two additional cards, discarding the two additional cards, or discarding two of the original 7 cards by placing the two cards face up, next to the shuffled deck of cards with the goal of creating unique words/phrases that correspond with the theme; manipulating the dealt cards to create words and phrases that correspond with the chosen theme to determine whether the hand is a winning hand; and continuing, for the predetermined period of time, to alternately pull two cards and discard two cards while keeping only 7 cards at a time, and forming as many words and phrases as possible. As words and phrases are formed with the cards, those cards may be set aside. Play may continue until the predetermined period of time is over. After the predetermined period of time is over, the player may record, on the score pad for example, the theme played, all words and phrases formed, and total points, including bonus points. If the player was unable to create any words or phrases, only record the bonus points from the bonus point card(s). After recording the winning word(s) and score(s), the next round(s) may be played until a score of 150 points has been reached. At any time during the game, if the deck gets too low for a game of play, the discarded cards may be shuffled back into the deck.

Figure 3:
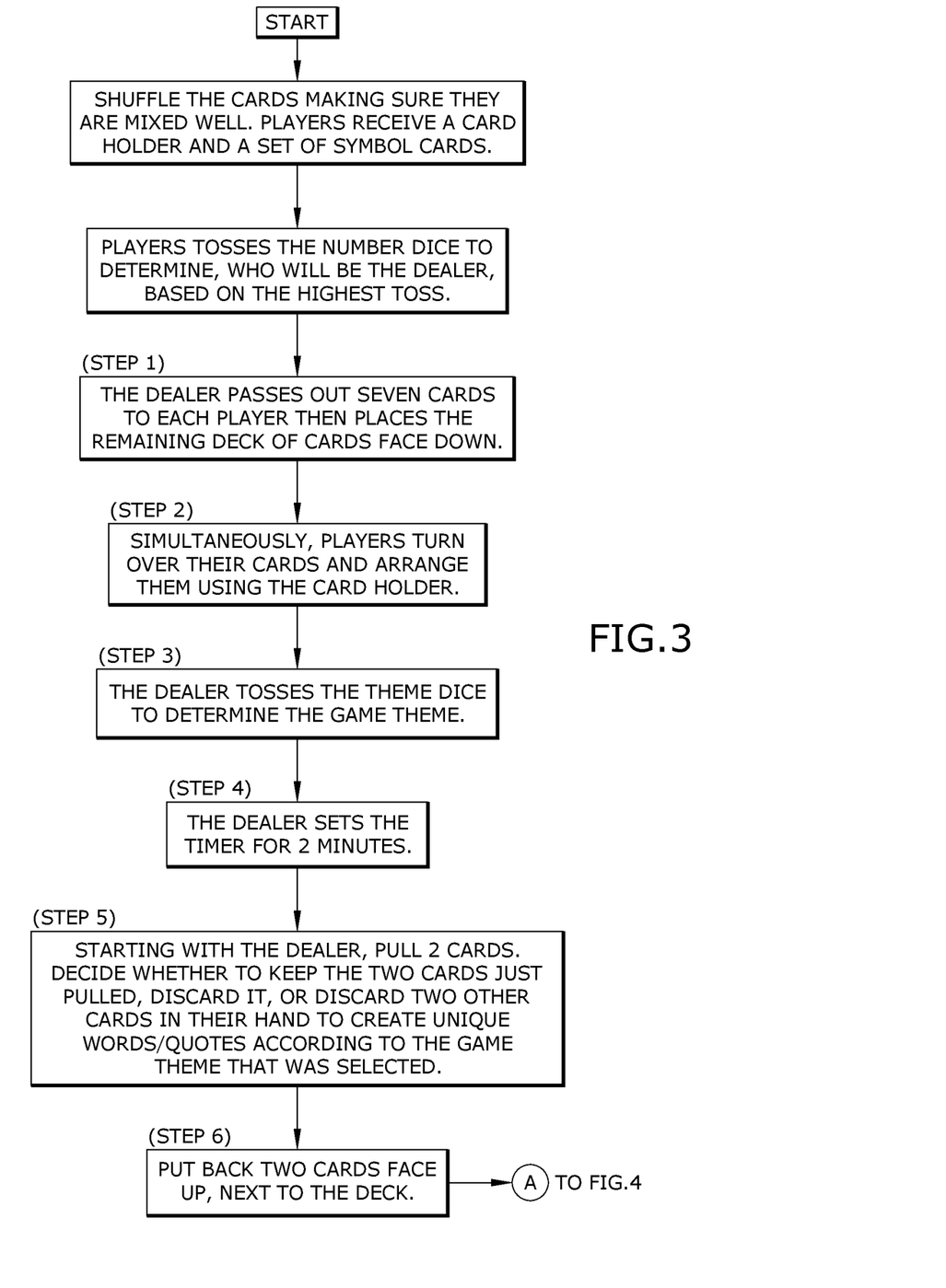
FIG. 3 is a flow chart describing one embodiment of the present disclosure.
Figure 4:
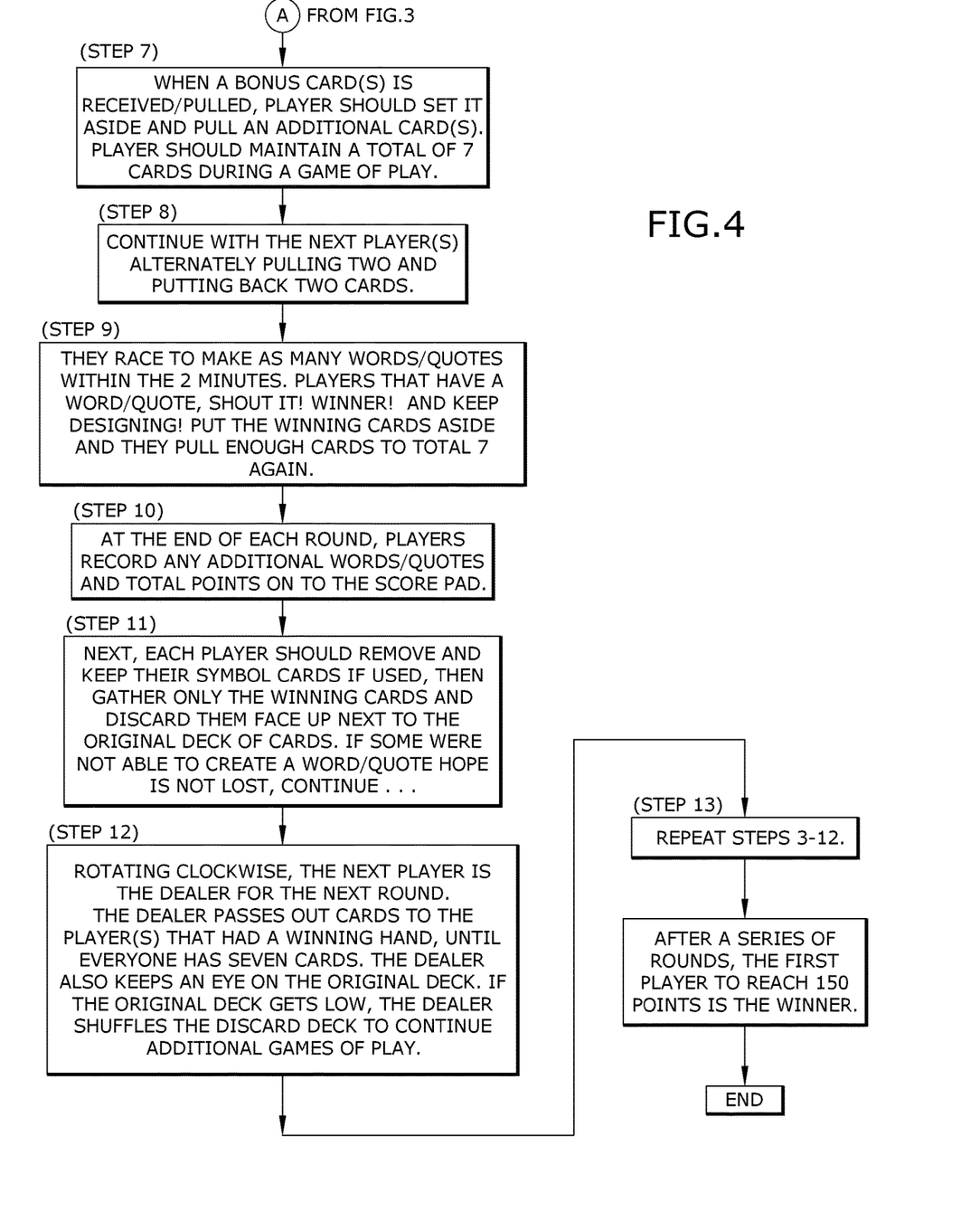
FIG. 4 is a continuation of FIG. 3.

Multiplayer Game:

As shown in FIGS. 3 and 4, a multiple player version of the method of playing the game of the present disclosure may comprise providing players with a playing surface including a card holder for each player and a score pad; providing the players with a set of 10 symbol cards; shuffling a deck of cards comprising 83 alphabet cards, 20 number cards, 5 bonus point cards, 2 universal symbol cards, and 5 wild cards; prior to starting a round, players may agree to using game random theme generator and alternate themes; tossing a numerical dice to determine which player is the dealer, wherein the player who tosses the dice and receives the highest number is the dealer for that round; dealing 7 cards from the shuffled deck to each player and placing the remaining cards face down on the playing surface; simultaneously turning over each players cards and arranging the cards using the card holder; generating a theme by having the dealer throw a random theme generator to determine the game theme or allowing a player to choose a theme. For example, the dealer may choose alternate theme by tossing the random number generator and matching it with a corresponding theme from a list of themes created before the beginning of the game.

The method may also comprise setting a timer for a predetermined period of time, such as for 2 minutes; simultaneously turning the dealt cards over and determining whether the dealt cards can be used. When a bonus card is pulled, the player should set it aside and pull an additional card to maintain a total of 7 cards during a game of play. If the dealt cards can be used, the method comprises forming words and phrases according to the theme. Starting with the dealer and moving clockwise thereafter, having each player pull 2 cards from the shuffled deck and decide whether to keep the two cards pulled, discard the two cards pulled, or discard two other cards from their hand by placing the discarded cards face up next to the deck of cards, with the goal of creating unique words and phrases according to the generated theme; and discarding two cards face up next to the shuffled deck. Play continues with the next player(s) alternately pulling two and discarding two cards. Players race to form the largest number of words and phrases in the predetermined period of time. Players that have a word shout it, winner, and keep designing. The winning cards may be placed aside and additional cards may be pulled from the shuffled deck to ensure the player maintains 7 cards in their hand at all times.

At the end of each round, the players record the theme played, all words and phrases formed, and total points, including bonus points on the score pad. Next, players with winning hands removes and keeps their symbol cards, if used, then the remaining cards that were used to make words and phrases are gathered and put into the discard pile and remaining cards are kept. Players that did not have a winning hand keep their cards for the next round, record their bonus point cards, and then discard them. Rotating clockwise, the next player is the dealer for the next round. The dealer passes out cards to the player(s) until everyone has 7 cards. The dealer also keeps an eye on the original deck and replenishes it with discarded cards if it gets low during play by shuffling the discarded cards into the deck. Play continues until a player reaches 150 points. If there is a tie, a tie breaker round may be played.

Figure 5:
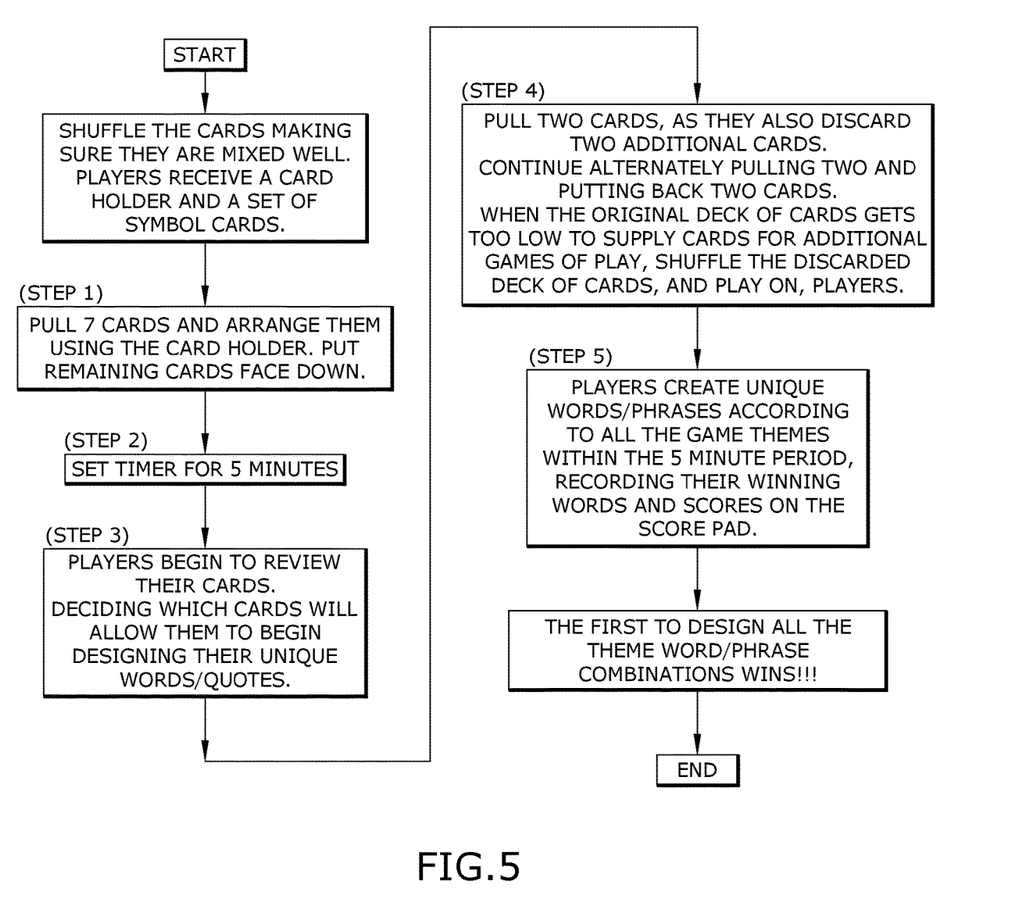
FIG. 5 is a flow chart of one embodiment of the present disclosure.

Accelerated All Themes Game:

As shown in FIG. 5, an accelerated all themes version of the method of playing the game of the present disclosure may comprise providing players with a playing surface including a card holder for each player and a score pad; providing the players with a set of 10 symbol cards; shuffling a deck of cards comprising 83 alphabet cards, 20 number cards, 5 bonus point cards, 2 universal symbol cards, and 5 wild cards; and designing words and phrases with all game themes, when using the random theme generator, excluding player and dealers choice. Prior to starting, players may agree to use different themes, as described above using the random number generator. Each player chooses the order in which to design their themes first, second, third, fourth, or all at the same time. In no certain order, players may pull 7 cards each from the deck and place them face down. Simultaneously, the cards may be turned over and placed on each player's card holder. Players that receive a bonus point card(s) may set them aside and pull additional card(s) to have a total of 7 cards for the game. A timer may then be set for a predetermined period of time, such as 5 minutes. Using the card holder, players may review their cards and decide which cards will allow them to begin creating their unique words and phrases. If the dealt cards can be used, the method comprises forming words and phrases according to the theme. In no certain order, players may pull two cards and decide whether to keep the cards, discard the two cards just pulled, or discard two other cards from their hand by placing them face up next to the original deck. Since players may either work on one theme at a time or on all themes simultaneously, players may choose to keep the cards that were pulled if they are able to use them for any of the themes they may be working on. Players working on multiple words and phrases are able to keep 7 cards on the card holder in addition to the other themes they are working on. Any cards that are not being used must be discarded. Players continue pulling two cards and putting back two cards. If the shuffled deck of cards gets too low for a game of play, the discarded cards may be shuffled and integrated into the original deck. As players create their unique words and phrases, they set them to the side and continue designing either until they have completed all of the themes or the time is up. After the end of the predetermined period of time, the players note each theme they were able to complete, record all words and phrases and total points, including bonus points, on the score pad. If a player was not able to create words/phrases, only record the bonus points. The first player to design "all the themes" in word and phrase combinations within the time period is the winner. If there is a tie with players creating the same number of words, the winner is determined by the player with the highest points for the words and phrases that they designed. If no one was able to complete any themes, record only the bonus points, play another round, and the player with the most words wins.

While the game and components are described above as physically existing, tangible components. The game may also be integrated and played in other formats, such as electronic devices.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A game assembly configured to promote abstract reasoning, problem solving, spatial reasoning, and time management by game players, the game assembly comprising:
   a deck of cards comprising:
      a plurality of alphabet cards;
      a plurality of numerical cards;
      a plurality of bonus point cards;
      at least one universal symbol card;
      at least one wild card; and
      at least one symbol card;
   a random number generator, arranged proximate the deck of cards
   a random theme generator, arranged proximate the deck of cards and the random number generator, the random theme generator comprising a size sided dice, wherein each side of the dice has a theme marked thereon, the themes comprising: alpha, alpha number, alpha symbol, alpha number symbol, player choice, and dealer's choice;
   a timer, communicatively engaged with the deck of cards, the random number generator, and the random theme generator; and
   a card holder, housing at least some of the deck of cards.

2. The game assembly of claim 1, wherein:
   the plurality of alphabet cards comprise letter cards including the letters A through Z marked thereon;
   the plurality of numerical cards comprise number cards including the numbers 0 through 9 marked thereon; and
   the symbol cards comprise a variety of different symbols marked thereon, the variety of different symbols comprising a dove, a heart, a star, eyes, a hand, bees, sports, money/$, a rock, and lights.

3. The game assembly of claim 1, wherein:
   the plurality of alphabet cards consists of 83 letter cards, including three sets of each consonant letter in the English alphabet and four sets of each vowel letter in the English alphabet;
   the plurality of numerical cards consists of 20 number cards, including two sets of each number 0 through 9;
   the symbol cards comprise ten different symbols printed thereon, the ten different symbols comprising a dove, a heart, a star, eyes, a hand, bees, sports, money/$, a rock, and lights, wherein the deck comprises 6 of each symbol card for a total of 60 symbol cards;
   the plurality of bonus cards consists of 5 bonus point cards, each including a bonus symbol marked thereon;
   the at least one wild card consists of 5 wild cards; and
   the at least one universal symbol card consists of two universal symbol cards.

4. A method of playing a game, the method comprising:
   providing a set of game components, the game components comprising:
      a deck of cards comprising:
         a plurality of alphabet cards;
         a plurality of numerical cards;
         a plurality of bonus point cards;
         at least one universal symbol card;
         at least one wild card; and
         at least one symbol card;
      a random number generator;
      a random theme generator;
      a timer; and
      a card holder;
   generating a theme by rolling the random theme generator and identifying the theme by viewing a side of the random theme generator that is parallel to a playing surface, wherein the random theme generator comprises a size sided dice, wherein each side of the dice has a theme marked thereon, the themes comprising: alpha, alpha number, alpha symbol, alpha number symbol, player choice, and dealer's choice;

dealing a plurality of cards to a player;

manipulating the plurality of cards to create words and phrases that correspond with the generated theme; and calculating a score based on the created words and phrases.

5. The method of claim 4, wherein:

the plurality of alphabet cards comprise letter cards including the letters A through Z marked thereon;

the plurality of numerical cards comprise number cards including the numbers 0 through 9 marked thereon; and the symbol cards comprise a variety of different symbols marked thereon, the variety of different symbols comprising a dove, a heart, a star, eyes, a hand, bees, sports, money/$, a rock, and lights.

6. The method of claim 5, wherein the deck of cards consists of:

83 alphabet cards;
20 number cards;
5 bonus point cards;
2 universal symbol cards;
5 wild cards; and
60 symbol cards.

* * * * *